United States Patent
Lepschy et al.

(10) Patent No.: US 11,758,057 B2
(45) Date of Patent: Sep. 12, 2023

(54) METHOD FOR DIMENSIONING A PCRF MODULE OF A COMMUNICATION SYSTEM

(71) Applicant: Telecom Italia S.p.A., Milan (IT)

(72) Inventors: Chiara Lepschy, Turin (IT); Francesco Silletta, Turin (IT)

(73) Assignee: Telecom Italia S.p.A., Milan (IT)

( * ) Notice: Subject to any disclaimer, the term of this patent is extended or adjusted under 35 U.S.C. 154(b) by 344 days.

(21) Appl. No.: 17/289,426

(22) PCT Filed: Oct. 25, 2019

(86) PCT No.: PCT/EP2019/079271
§ 371 (c)(1),
(2) Date: Apr. 28, 2021

(87) PCT Pub. No.: WO2020/089113
PCT Pub. Date: May 7, 2020

(65) Prior Publication Data
US 2021/0360111 A1    Nov. 18, 2021

(30) Foreign Application Priority Data
Oct. 31, 2018  (IT) .......................... 102018000009960

(51) Int. Cl.
H04M 15/00 (2006.01)
(52) U.S. Cl.
CPC ....... *H04M 15/66* (2013.01); *H04M 15/8027* (2013.01); *H04M 15/8214* (2013.01)
(58) Field of Classification Search
CPC ............. H04M 15/66; H04M 15/8228; H04M 15/8214; H04L 12/1407
See application file for complete search history.

(56) References Cited

U.S. PATENT DOCUMENTS

| | | | |
|---|---|---|---|
| 9,450,766 B2* | 9/2016 | Lehane | H04L 41/5019 |
| 10,038,988 B2* | 7/2018 | McNamee | H04L 12/1407 |
| 10,609,224 B2* | 3/2020 | Mandanapu | H04M 15/60 |

(Continued)

OTHER PUBLICATIONS

Jul. 9, 2019—(IT) Search Report and Written Opinion—IT App 201800009960.

(Continued)

*Primary Examiner* — Pakee Fang
(74) *Attorney, Agent, or Firm* — Banner & Witcoff, Ltd.

(57) ABSTRACT

Dimensioning a policy and charging rules function (PCRF) of a communication system comprises: determining a number of processing nodes of the PCRF at a time; determining a first transaction parameter indicating a number of transactions per second exchanged by the nodes at the time; determining a load parameter indicating processing load of the nodes at the time; based on the first transaction parameter, the load parameter, the number of nodes, and allowable processing load that the nodes are set, determining a second transaction parameter indicating a number of transactions per second expected for exchange at the time by the nodes set at the allowable processing load; forecasting the first and second transaction parameters for a following time thereby obtaining forecasted first and second transaction parameters; and determining a number of nodes required at the following time according to the forecasted first and second transaction parameters.

13 Claims, 4 Drawing Sheets

(56) References Cited

U.S. PATENT DOCUMENTS

2016/0344817 A1 11/2016 Renzullo et al.
2017/0195898 A1* 7/2017 Logan .................. H04W 24/02

OTHER PUBLICATIONS

Dec. 10, 2020—(WO) International Search Report and Written Opinion—App PCT/EP2019/079271.
Sami Tabbane, "Core network and transmission dimensioning", Aug. 7, 2016 (Aug. 7, 2016), Retrieved from the Internet: <URL:https://www.itu.int/en/ITU-D/Regional-Presence/AsiaPacific/SiteAssets/Pages/Events/2016/Aug-WBB-Iran/Wirelessbroadband/core%20network%20dimensioning.pdf> XP055603342 [retrieved on Jul. 8, 2019].
"Ericsson Service-Aware Policy Controller 2012A, Network Impact Report", Ericsson España, S.A., Ericsson ref. 109 48-FGC 101 1723 Uen D, Dec. 21, 2012.

* cited by examiner

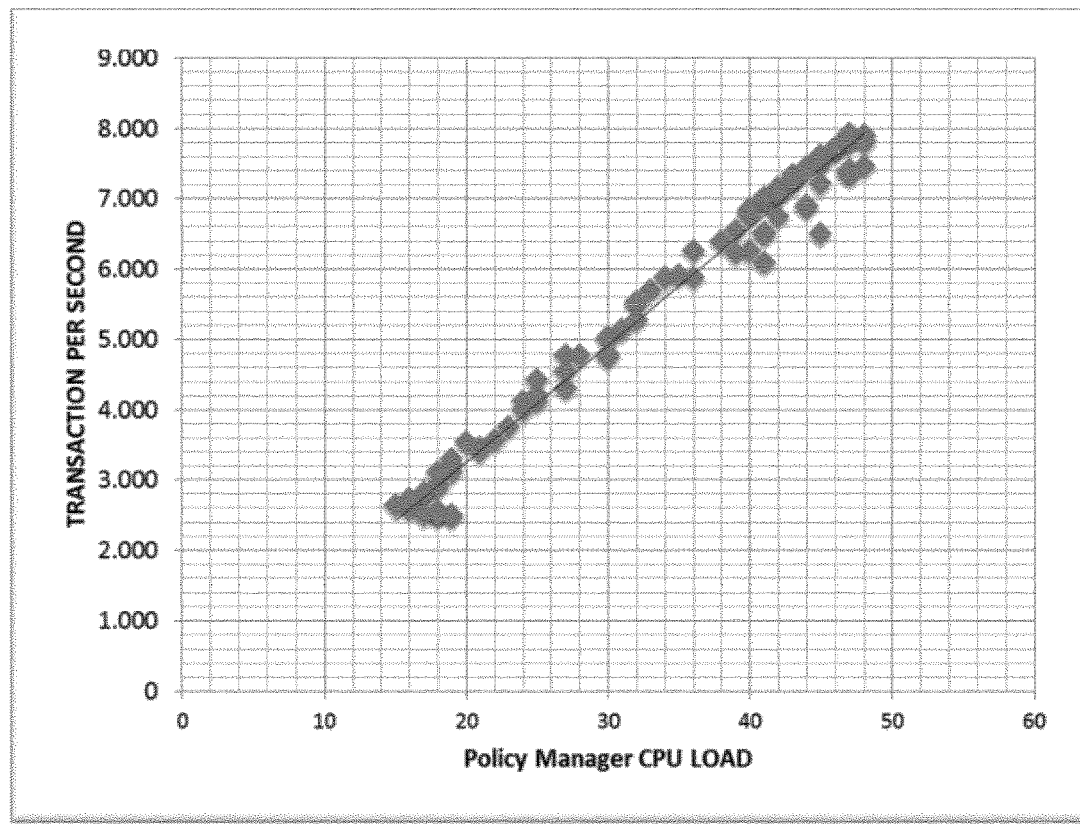
Figure 4

METHOD FOR DIMENSIONING A PCRF MODULE OF A COMMUNICATION SYSTEM

CROSS REFERENCE TO RELATED APPLICATIONS

This application is 371 US National Stage of PCT/EP2019/079271 filed on Oct. 25, 2019 which claims priority from Italian Application 102018000009960 filed on Oct. 31, 2018, the contents of which are incorporated herein by reference.

BACKGROUND OF THE INVENTION

Field of the Invention

The present invention generally relates to the field of core networks of communication systems. Particularly, the present invention relates to a method for dimensioning a core network. More particularly, the present invention relates to a method for dimensioning a "Policy and Charging Rules Function" (PCRF) module of a communication system, typically—although not exclusively—a wireless (e.g., mobile) communication system.

Overview of the Related Art

The "Policy and Charging Rules Function" (PCRF) module is a functional element that encompasses policy control decision and flow based charging control functionalities. The PCRF module provides network control regarding service data flow detection, gating, "Quality of Service" (QoS) and flow based charging (except credit management) towards a "Policy and Charging Enforcement Function" (PCEF) module that, in the generic policy and charging control 3GPP model, is the functional entity that supports service data flow detection, policy enforcement and flow-based charging. Moreover, the PCRF module receives session and media related information from an "Application Function" (AF) module and informs the AF module of traffic plane events (http://www.lteandbeyond.com/2012/01/gx-interface-sitting-between-perf-and.html). In this context, the AF module represents a network element that supports applications requiring dynamic policy and/or charging control. In the IP Multimedia Subsystem (IMS) model, the AF module may for example be implemented by a "Proxy Call Session Control Function" (P-CSCF) module.

Considering, just as an example, 2G/3G and LTE ("Long Term Evolution") access networks, the PCRF module may work both in the 2G/3G and LTE access networks, but LTE access network requires significantly more capacity in both data and control planes. The existing 2G/3G elements of the mobile core network cannot fully address LTE technology requirements without platform upgrades. Most of existing platforms that are envisaged to evolve to address LTE technology requirements are not suited for high-capacity packet processing.

Scaling packet processing requirements on these platforms typically results in higher consumption of system capacity, high latency, low performance and dramatic performance/feature trade-offs. In some cases, performance drops more than 50% when features like charging are enabled. Legacy core platforms must dramatically change their product architectures to handle LTE technology, and even with these architectural changes, they are only a stop-gap solution that may require complex upgrade scenarios to address LTE technology scalability and performance requirements.

In order to establish an end-to-end network connectivity between a user device and the core network, the user device uses the LTE access network to reach a "Mobility Management Entity" (MME) module (forming an LTE front end node) or the 2G/3G access network to reach a "Serving GPRS Support Node" (SGSN) module (forming a 2G/3G front end node). Both the MME and SGSN modules are in charge to accept or refuse to set-up a connection with the user device on the basis of customer credential and authorization profile. As soon as the connectivity is requested by the user device, the "PDN Gateway" (P-GW) and "Gateway GPRS Support Node" (GGSN) modules are involved to manage the connection (respectively, the LTE connection and the 2G/3G connection) with the user device and to apply the policy rules compatible with the customer profile or the service requested by the customer through the user device.

The control of the policy and the information exchanged between the PCRF module and the front end nodes (i.e., the MME and SGSN modules) is essentially based on signalling. Each signal is a standard message that "Third Generation Partnership Project" (3GPP) has defined for the following "behaviours": setting up a connection, stopping a connection, regulating the traffic throughput, reducing/increasing data throughput for a single user device, selecting a particular APN (specific APN connections are used to identify specific Customer Profiles, such as Mass Market Consumers, MVNOs or Corporate Customers) or a particular URL (i.e. a specific URL can be blocked to avoid peering or fraud). The session between the PCRF module and the GGSN/P-GW modules is always active as long as the connectivity requested by the user device is on. The service control logic that the PCRF module enables is taken into account by GGSN and P-GW module, which alert the PCRF module if some event occurs.

A detailed description of procedures of the PCRF module is described, for example, in 3GPP TS 21.905, 3GPP TS 29.210, and 3GPP TS 29.212.

The total amount of signalling (in terms of transaction per second) is quite impressive, and it is expected to increase in the future.

A PCRF module typically comprises a number of processing nodes (also referred to as policy manager nodes) each one for managing connections of respective user devices on the GGSN module or on the P-GW module, and, for each policy manager node, a number of processing units (such as processing boards) for processing signalling between the respective policy manager node and the GGSN module and between the respective policy manager node and the P-GW module.

At the present, PCRF module vendors provide a general dimensioning rule helping the designer to evaluate the potential numbers of policy manager nodes and of processing boards for each policy manager node needed to correctly dimension a core network.

An example of this general dimensioning rule can be found in "Ericsson Service-Aware Policy Controller 2012A, Network Impact Report", Ericsson España, S. A., Ericsson ref. 109 48-FGC 101 1723 Uen D, 21 Dec. 2012.

SUMMARY OF INVENTION

The Applicant has found that none of the solutions known in the art is satisfactory.

In particular, the Applicant has found that none of the solutions known in the art, including the above-cited document "Ericsson Service-Aware Policy Controller 2012A, Network Impact Report", provides easy dimensioning rules to be applied if the deployment on field of the policy manager nodes requires an ad hoc implementation or variations that are not taken into account by the vendor's use cases or different from the cases that have been tested in laboratory.

This implies that, to avoid any inconvenient in live environment, the number of policy manager nodes needed at the first deployment could be greater than the one determined in laboratory. For this reason, the general dimensioning rule is to deploy a number of policy manager nodes that is greater than the one determined in laboratory so as to cover different scenarios such as unexpected increasing of the number of customers and/or issues in the behaviour of the PCRF module in the live environment (for example, in order to prevent faults).

The Applicant has also understood that the above issues are exacerbated when considering communication systems wherein 2G/3G and LTE access networks coexist together with other access networks, such has the upcoming 5G access networks (which require significantly more capacity in both data and control planes, and whose technology requirements cannot be fully addressed by the existing 2G/3G and LTE elements of the mobile core network).

The Applicant has faced the above-mentioned issues, and has devised a method and system for correctly and effectively dimensioning a PCRF module in a dynamic way.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for dimensioning a policy and charging rules function (PCRF) module of a communication system. The method preferably comprises:

determining a number of processing nodes of the PCRF module at a time instant;

determining a first transaction parameter indicative of a number of transactions per second exchanged by the processing nodes at the time instant;

determining a load parameter indicative of a processing load of the processing nodes at the time instant;

based on said first transaction parameter, on said load parameter, on said number of processing nodes, and on an allowable processing load at which the processing nodes are set for allowing a safe operation thereof, determining a second transaction parameter indicative of a number of transactions per second that are expected to be exchanged at the time instant by the processing nodes set at the allowable processing load;

forecasting the first transaction parameter for a following time instant following the time instant thereby obtaining a forecasted first transaction parameter;

forecasting the second transaction parameter for said following time instant thereby obtaining a forecasted second transaction parameter;

determining a number of processing nodes required at said following time instant according to said forecasted first transaction parameter and to said forecasted second transaction parameter.

According to an embodiment of the present invention, said determining a number of processing nodes at said following time instant is based on a ratio between the forecasted first transaction parameter and the forecasted second transaction parameter.

According to an embodiment of the present invention, additional or alternative to any of the previous embodiments, the method further comprises:

determining a context parameter indicative of a number of active connections that are managed by the processing nodes at the time instant, each active connection preferably comprising one or more exchanged transactions that are exchanged by the processing nodes at the time instant;

based on said first transaction parameter and on said context parameter, determining a signalling consumption parameter preferably indicative of a number of transactions per second that are expected to be exchanged for each active connection at the time instant, and forecasting the context parameter and the signalling consumption parameter for the following time instant thereby obtaining a forecasted context parameter and a forecasted signalling consumption parameter.

Said forecasting the first transaction parameter is preferably based on at least one among the forecasted context parameter, the forecasted signalling consumption parameter, and the forecasted second transaction parameter.

According to an embodiment of the present invention, additional or alternative to any of the previous embodiments, said forecasting the first transaction parameter is based on a change of at least one among the forecasted context parameter, the forecasted signalling consumption parameter and the forecasted second transaction parameter with respect to the context parameter, the signalling consumption parameter and the second transaction parameter, respectively.

According to an embodiment of the present invention, additional or alternative to any of the previous embodiments, the forecasted context parameter depends on marketing information provided by a network operator of the communication system.

According to an embodiment of the present invention, additional or alternative to any of the previous embodiments, the forecasted context parameter is based on analysis of at least one among data traffic for access point name and type of radio access technology.

According to an embodiment of the present invention, additional or alternative to any of the previous embodiments, the forecasted signalling consumption parameter depends on service and/or parameter changes in the communication system.

According to an embodiment of the present invention, additional or alternative to any of the previous embodiments, the forecasted second transaction parameter depends on policy rule and/or connection type changes in the communication system.

According to an embodiment of the present invention, additional or alternative to any of the previous embodiments, said determining a signalling consumption parameter comprises:

determining an instant signalling consumption parameter based on a ratio between said first transaction parameter and said context parameter, and determining the signalling consumption parameter based on historical instant signalling consumption parameters determined before the time instant, preferably by averaging said instant signalling consumption parameter and said historical instant signalling consumption parameters.

According to an embodiment of the present invention, additional or alternative to any of the previous embodiments, said determining a second transaction parameter comprises:

determining an instant second transaction parameter based on a ratio between the first transaction parameter and the load parameter, and preferably on a ratio between the number of processing nodes and the allowable processing load, and determining the second transaction parameter based on historical instant second transaction parameters determined before the time instant, preferably by averaging said instant second transaction parameter and said historical instant second transaction parameters.

According to an embodiment of the present invention, additional or alternative to any of the previous embodiments, each processing node comprises one or more processing units. Said determining a load parameter indicative of a processing load of the processing nodes at the time instant preferably comprises:

determining, for each processing node, at least one further load parameter each one indicative of a processing load of a respective processing unit of that processing node at the time instant, and determining the load parameter based on the at least one further load parameter and on a number of said one or more processing units.

According to an embodiment of the present invention, additional or alternative to any of the previous embodiments, the method further comprises:

based on the at least one further load parameter, determining a further second transaction parameter indicative of a number of transactions per second that are expected to be exchanged at the time instant by each processing unit set at the allowable processing load, and forecasting the further second transaction parameter for said following time instant, thereby obtaining a forecasted further second transaction parameter.

Advantageously, said determining a number of processing nodes required at the following time instant is also based on said forecasted further second transaction parameter and on a maximum number of processing units that is allowed for each processing node.

According to an embodiment of the present invention, additional or alternative to any of the previous embodiments, the method further comprises determining a number of processing units required at the following time instant according to a ratio between the forecasted first transaction parameter and the forecasted further second transaction parameter.

According to an embodiment of the present invention, additional or alternative to any of the previous embodiments, the method further comprises determining that the following time instant requires additional processing nodes if the forecasted first transaction parameter is higher than the second transaction parameter evaluated over the number of processing nodes.

BRIEF DESCRIPTION OF THE ANNEXED DRAWINGS

These and other features and advantages of the present invention will be made apparent by the following description of some exemplary and non-limitative embodiments thereof; for its better intelligibility, the following description should be read making reference to the attached drawings, wherein.

Figure 3:
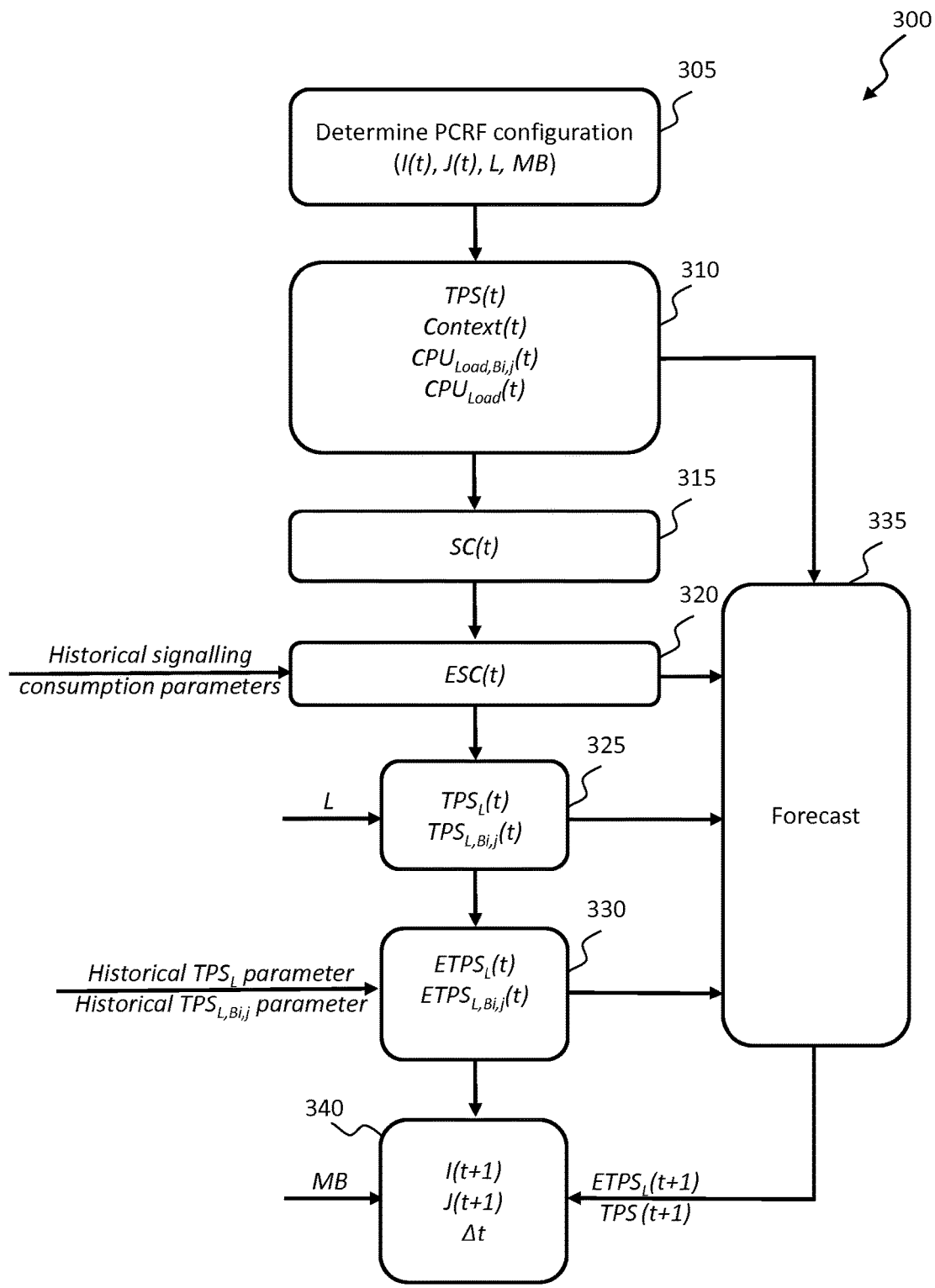

FIG. 3 shows an activity diagram of a dimensioning method according to an embodiment of the present invention, and FIG. 4 shows, on the top, an example of a daily profile of signalling traffic exchanged between the PCRF module and GGSN and P-GW modules of the communication system and of a corresponding average processing load, and, on the bottom, a correlation between said signalling traffic and said average processing load.

DETAILED DESCRIPTION OF PREFERRED EMBODIMENTS OF THE INVENTION

Figure 1:
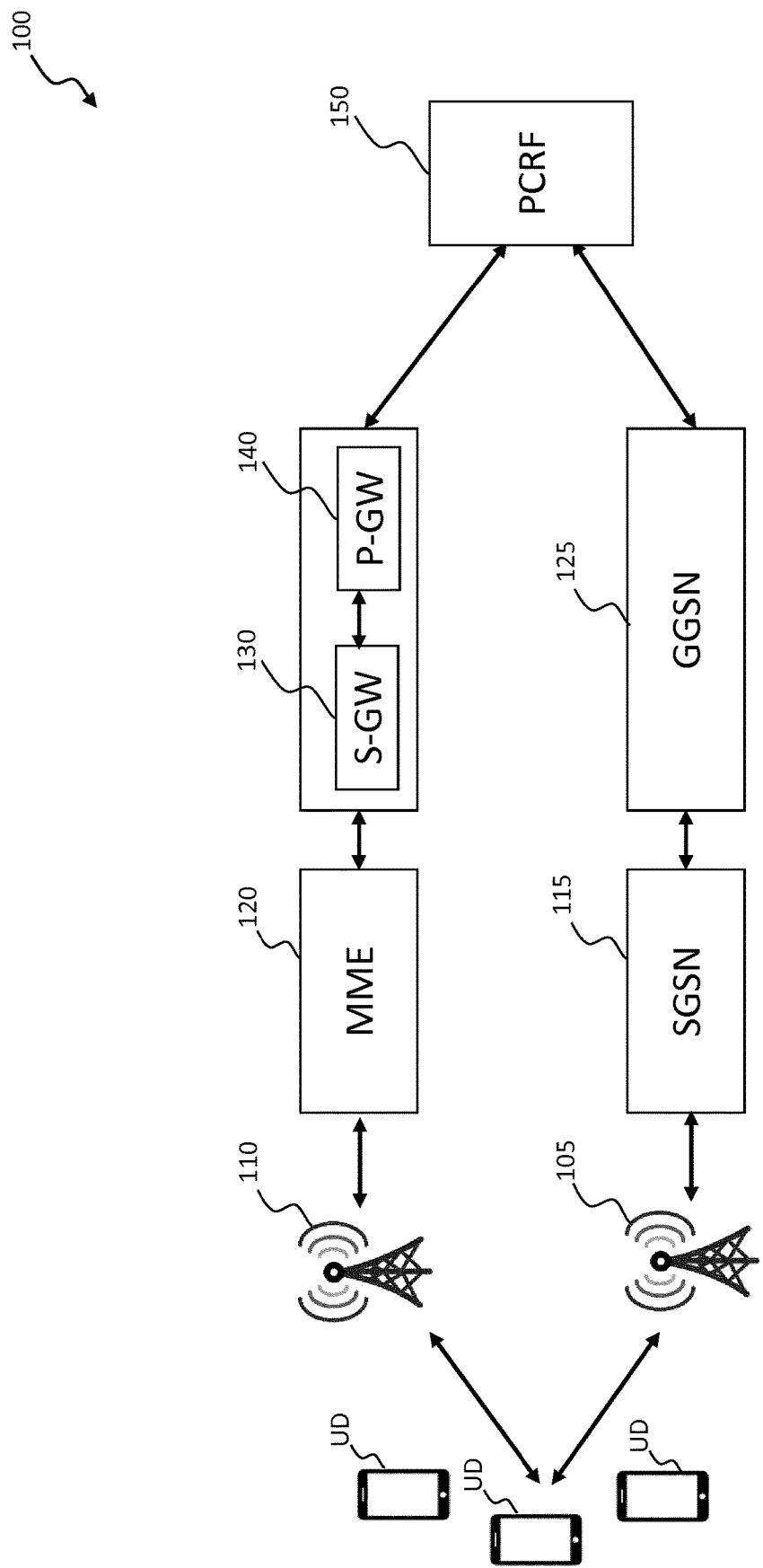
FIG. 1 shows a basic architecture of a communication system according to an embodiment of the present invention.

FIG. 1 shows a basic architecture of a communication system (e.g., a mobile communication system) 100 according to an embodiment of the present invention. In the following, only components and modules of the communication system 100 considered relevant for the understanding of the present invention will be illustrated and discussed.

The communication system 100 comprises a number of transceiver stations for connection to one or more radio access networks.

In the exemplary simplified scenario herein illustrated and considered, two transceiver stations are provided, namely a transceiver station (hereinafter referred to as 2G/3G transceiver station) 105 for connection to a 2G/3G radio access network—for example, GRAN (GSM Radio Access Network), GERAN (GSM Edge Radio Access Network, or UTRAN (UMTS Terrestrial Radio Access Network) radio access networks—and a transceiver station (hereinafter referred to as LTE transceiver station or Evolved Node B or eNodeB) 110 for connection to a LTE radio access network—for example, E-UTRAN (Evolved UMTS Terrestrial Radio Access Network) radio access network. However, without losing generality, other transceiver stations for connection to different radio access technologies (e.g., 5G, Wireless Local Area Network and WiMAX) may be provided additionally or alternatively to the 2G/3G transceiver station 105 and/or the LTE transceiver station 110.

Each radio access network (or each group of radio access networks) preferably implements a respective radio access technology providing connection of user devices UD of (i.e., connecting to) the communication system 100 to a respective core network of the communication system 100. In the example at issue of a communication system comprising the 2G/3G transceiver station 105 and the LTE transceiver station 110, the communication system 100 comprises two (conceptually distinct) core networks, namely a GPRS core network to which the user devices UD of the communication system 100 connect through the 2G/3G transceiver station 105 and the 2G/3G radio access network, and an EPC ("Evolved Packet Core") core network to which the user devices UD of the communication system 100 connect through the LTE transceiver station 110 and the LTE radio access network.

Each core network (such as the GPRS and EPC core networks) is preferably connected to one or more external IP networks, such as one or more "Packet Data Networks" (or PDN networks), not shown: examples of PDN networks include Internet and "IP Multimedia Subsystem" (IMS) networks.

For the purposes of the present disclosure, the communication system 100 preferably comprises the following modules—the term "module" being herein intended to emphasize functional (rather than implementation) aspects thereof. Indeed, without losing generality, each module may be implemented by software, hardware, and/or a combination thereof. Moreover, the modules may also reflect, at least conceptually, the physical structure of the communication system 100:

SGSN ("Serving GPRS Support Node") module 115. The SGSN module 115, which is part of the GPRS core network, is for example responsible for authentication of users, for mobility management, for session management, for "Quality of Service" (QoS), for interfacing towards the 2G/3G radio access network, for traffic routing towards the GGSN module (discussed here below) and for inbound roaming management;

GGSN ("Gateway GPRS Support Node") module 125. The GGSN module 125, which is part of the GPRS core network, is for example responsible for routing data towards identified PDN network from an APN ("Access Point Name"), for assigning IP addresses to the user devices UD, for managing documentations for legal purposes, and for outbound roaming charging and management;

"Mobility Management Entity" (MME) module 120. The MME module 120, which is part of the EPC core network, is the key control-node for the LTE radio access network. It is responsible for idle mode user device UD paging and tagging procedure including retransmissions. It is involved in bearer activation/deactivation processes and is also responsible for choosing the S-GW module (discussed here below) for a user device UD at the initial attach and at time of intra-LTE handover involving core network node relocation;

"Serving Gateway" (S-GW) module 130. The S-GW module 130, which is part of the EPC core network, is the point of interconnect between the LTE radio access network and the EPC core network, and serves the user devices UD by routing the incoming and outgoing IP data packets. It is responsible for authenticating the users, and specifically for requesting to a "Home Subscriber Server" (not shown) authentication and profile of users and to update location information of the user devices UD;

"PDN Gateway" (P-GW) module 140. The P-GW module 140, which is part of the EPC core network, is the point of interconnect between the EPC core network and the PDN network(s), and routes the IP data packets to and from the PDN network(s).

For the purposes of the present disclosure, the communication system 100 further comprises a "Policy and Charging Rules Function" (PCRF) module 150 for determining policy rules in the communication system 100.

Particularly, the PCRF module 150 is responsible for determining access control policy rules (i.e., enabling transmission of authorized IP data flows over the operator's network), QoS Control policy rules (i.e., assigning and management of a QoS policy rule specific for IP data flow e for user device UD), charging control policy rules (i.e., management of an online/offline charging profile specific for IP data flow and for user device UD), usage monitoring control policy rules (i.e., monitoring of radio resources used by the user device UD, e.g. in terms of exchanged uplink and/or downlink data traffic, and corresponding implementation of ad hoc rules), application and detection control policy rules (i.e., activation of requests for traffic recognition at the application level in order to implement specific enforcement actions, such as blocking or rate-limiting of a specific application).

Preferably, as herein assumed, the functional entity that executes the policy & charging rules is the "Policy and Charging Enforcement Function" (hereinafter, PCEF module). This functionality is associated with the operator's gateway, i.e. the GGSN module 125 in the GPRS core network and the P-GW module 140 in the EPC core network.

Figure 2:
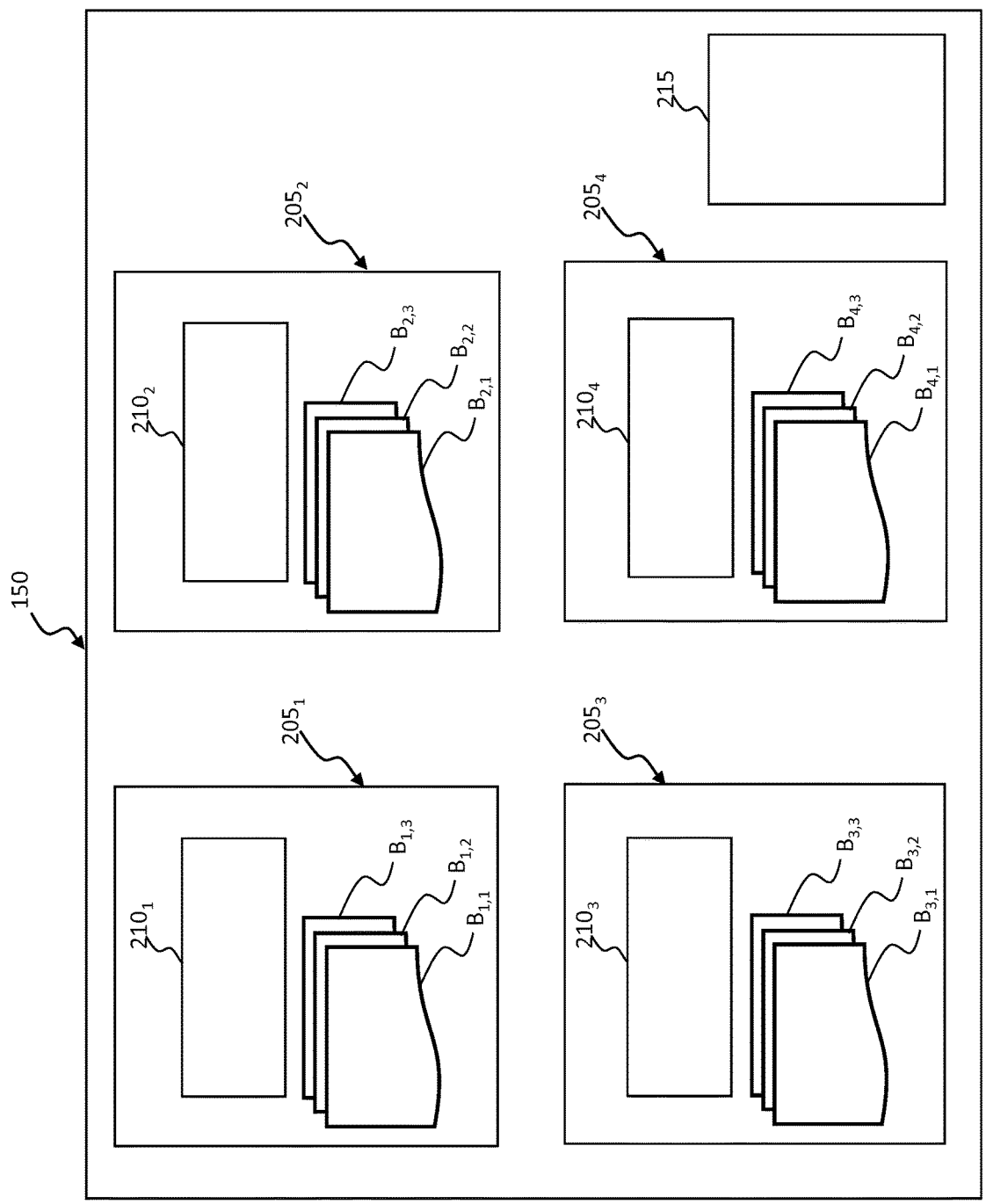
FIG. 2 shows a simplified representation of a PCRF module of the communication system according to an embodiment of the present invention.

FIG. 2 shows a simplified and schematic representation of the PCRF module 150 according to an embodiment of the present invention.

The PCRF module 150 advantageously comprises, at a time instant t, a number I(t) of processing nodes (also referred to as policy manager nodes, hereinafter PM nodes) $205_i$. In the exemplary illustrated embodiment, I(t)=4, namely four PM nodes $205_1, 205_2, 205_3, 205_4$ are provided at the time instant t; as will be better understood from the following disclosure, the number I(t+1) of PM nodes $205_i$ at a time instant (t+1) following the time instant t is advantageously determined (and preferably periodically updated) based on a dimensioning method (discussed here below) implemented by the PCRF module 250 (reason why for the number of PM nodes $205_i$ the dependency on time t or (t+1) is made explicit). The PM nodes $205_i$ are preferably configured to manage connections of each user device UD (i.e., logical links enabling the user device UD to transport data) on the GGSN module 125 or on the P-GW module 140. A user device may have one or more connections, each PM node $205_i$ for example processing policy rules (e.g., QoS rules) that apply to a single connection.

Each PM node $205_i$ preferably comprises one or more processing units (such as one or more processing boards) $B_{i,j}$ (j=1, 2, . . . , J) for processing signals between the PCRF module 150 (i.e., the respective i-th PM node $205_i$) and the GGSN module 125 and signals between the PCRF module 150 (i.e., the respective i-th PM node $205_i$) and the P-GW module 140. In the exemplary illustrated embodiment, J(t)=3, namely three processing boards $B_{i,1}$, $B_{i,2}$, $B_{i,3}$ are provided for each i-th PM node $205_i$ at the time instant t; as will be better understood from the following disclosure, the number J(t) of processing boards $B_{i,j}$ for each i-th PM node $205_i$ at the time instant (t+1) following the time instant t is advantageously determined (and preferably periodically updated) based on said dimensioning method (discussed here below). Although not shown, each processing board $B_{i,j}$ preferably comprises a CPU ("Central Processing Unit"), or more thereof, each processing board $B_{i,j}$ (or at least a subset thereof) for example comprising the processor board described in section 2.4 of document "NSP 6.1 Hardware Description" by Ericsson AB, Ericsson ref. 2011. 1/1551-APR 901 0461/1 Uen C, 14 Oct. 2011.

Although the following description will refer to the case of a number of processing boards that is the same for each PM node $205_i$, the number of processing boards may, in general, be different for different PM nodes $205_i$.

The signals between the PCRF module 150 and the GGSN module 125 and between the PCRF module 150 and the P-GW module 140 may for example be "Third Generation Partnership Project" (3GPP) standard messages defined for setting up a connection, stopping a connection, regulating traffic throughput, reducing/increasing data throughput for a single user device UD, selecting a particular APN (specific APN connections are used to identify specific Customer Profiles, such as Mass Market Consumers, MVNOs or Corporate Customers) or a particular URL (i.e., a specific URL can be blocked to avoid peering or fraud); in the following, the signals between the PCRF module 150 and the GGSN module 125 and the signals between the PCRF module 150 and the P-GW module 140 will be broadly referred to also as signalling or signalling events or signalling traffic, when discriminating among them is not necessary for the present disclosure.

Each PM node $205_i$ preferably comprises one or more storage components (e.g., "Random Access Memory" (RAM) and/or "Hard Disk Drive" (HDD) modules) $210_i$, the storage components $210_i$ being for example adapted to store historical and current data about signalling events (such as number of signalling events sent/received by the respective PM nodes $205_i$), and/or about processing load on the CPU of each respective processing board $B_{i,j}$. In the example at issue, each PM node $205_1$, $205_2$, $205_3$, $205_4$ comprises a respective storage compartment $210_1$, $210_2$, $210_3$, $210_4$.

The PCRF module 150 preferably comprises a control unit 215 for controlling the operation of the PCRF module 150 (such as for signalling dispatching, load balancing among the PM nodes $205_i$ and processing boards $B_{i,j}$ thereof, and/or for accessing the storage components $210_i$).

Although in the foregoing the PCRF module 150 has been discussed as comprising physical PM nodes $205_i$, physical CPUs $B_{i,j}$, physical RAMs and/or physical HDDs $210_i$, this should not be construed as limiting; in fact, the principles of the present invention equivalently apply to a Virtual Machine implementation of the PCRF module 150 (hereinafter, virtual PCRF module) providing virtual CPUs (vC-PUs), virtual RAMs and/or virtual HDDs, and virtual Network Interface Cards (vNICs) emulated by a software usually referred to as hypervisor. An example of a virtual PCRF module is the virtual Service-Aware Policy Controller (vSAPC) by Ericsson. Considering, just as an example, the vSAPC architecture, the Load Balancer, File Server and Node Manager virtual machines may implement respective functionalities of the control unit 215, whereas the Control Plane virtual machines may implement PM node $205_i$ or processing board $B_{i,j}$ functionalities (i.e., signalling or transactions per second processing), with the outcome of the proposed dimensioning method that may therefore represent the number of the Control Plane virtual machines to be instantiated.

FIG. 3 shows an activity diagram of a dimensioning method 300 according to an embodiment of the present invention. Without losing of generality, the operation steps of the dimensioning method 300 may be implemented by software (in which case, the resulting dimensioning method 300 would be performed by proper code means included in a computer program, when the program is run on a computer), hardware, and/or a combination thereof. The operation steps of the dimensioning method 300 may for example be performed at the control unit 215, although this should not be construed as limiting.

The dimensioning method 300 preferably comprises determining a configuration of the PCRF module 150 (e.g., current number I(t) of PM nodes $205_i$ and number n of processing boards $B_{i,j}$ for each PM node $205_i$)—action node 305.

Then, action node 310, the dimensioning method 300 preferably comprises determining one or more (all, in the preferred embodiment herein considered) among the following parameters:

TPS(t) parameter: a parameter indicative of a number of transactions per second (e.g., signalling events) sent/received (i.e. exchanged) by the PCRF module 150 (i.e., by the I PM nodes $205_i$) at the (current) time instant t. The TPS(t) parameter is for example determined according to the data stored in the storage components $210_i$ of the PM nodes $205_i$, preferably by aggregating (e.g., summing to each other) the number of transactions sent/received by each i-th PM node $205_i$;

Context(t) parameter: a parameter indicative of a number of connections that are managed by the PCRF module 150 (i.e., by the I PM nodes $205_i$) at the time instant t (the connections managed by the PCRF module 150 at the time instant t being therefore active connections that are active at the time instant t). Each connection, or active connection, may comprise (and typically comprises) one or more signalling events (i.e., one or more exchanged transactions that are exchanged by the PM nodes $205_i$). The Context(t) parameter is for example determined according to the data stored in the storage components $210_i$ of the PM nodes $205_i$, preferably by aggregating (e.g., summing to each other) the number of connections managed by each i-th PM node $205_i$. The Context(t) parameter may also be omitted in a basic implementation of the dimensioning method 300;

$CPU_{Load,Bi,j}(t)$ parameter: a parameter indicative of the processing load on the CPU of the j-th processing board $B_{i,j}$ of the i-th PM node $205_i$ that is processing the signalling at the time instant t. Preferably, although not necessarily, the $CPU_{Load,Bi,j}(t)$ parameter is expressed in percentage, the $CPU_{Load,Bi,j}(t)$ parameter for example ranging from a minimum percentage value (for example, 0%) to a maximum percentage value (for example, 100%). More preferably, the $CPU_{Load,Bi,j}(t)$ parameter is expressed as a percentage of a nominal or theoretical or maximum processing load that can be sustained by the j-th processing board $B_{i,j}$ of the i-th PM node $205_i$. However, the $CPU_{Load,Bi,j}(t)$ parameter may also be omitted in a basic implementation of the dimensioning method 300;

$CPU_{Load}(t)$ parameter: a parameter indicative of the processing load (on the CPUs of the processing boards $B_{i,j}$) of the PM nodes $205_i$ that are processing the signalling at the time instant t, the CPU parameter being therefore an overall or total processing load (on the CPUs of the processing boards $B_{i,j}$) of the PM nodes $205_i$ that are processing the signalling at the time instant t. The $CPU_{Load}(t)$ parameter may for example be determined based on the $CPU_{Load,Bi,j}(t)$ parameter (if provided); preferably, the $CPU_{Load}(t)$ parameter is determined based on the $CPU_{Load,Bi,j}(t)$ parameters associated with the total number (e.g., I(t)*J(t)) of processing boards $B_{i,j}$ that are processing the signalling at the time instant t, more preferably the $CPU_{Load}(t)$ parameter is determined based on a combination of the $CPU_{Load,Bi,j}(t)$ parameters associated with the total number (e.g., I(t)*J(t)) of processing boards $B_{i,j}$ that are processing the signalling at the time instant t. According to the preferred (not limiting) embodiment herein considered, the $CPU_{Load}(t)$ parameter comprises a measure of the average processing loads on the CPUs of the processing boards $B_{i,j}$ (of the i-th PM node $205_i$) that are processing the signalling at the time instant t (i.e., for each i-th PM node $205_i$, the average of the $CPU_{Load,Bi,j}(t)$ parameters). Preferably, although not necessarily, the $CPU_{Load}(t)$ parameter is expressed in percentage, the $CPU_{Load}(t)$ parameter for example ranging from a minimum percentage value (for example, 0%) to a maximum percentage value (for example, 100%)— similarly to the above, the $CPU_{Load}(t)$ parameter is advantageously expressed as a percentage of a nominal or theoretical or maximum processing load that can be sustained by the PM nodes $205_i$ (e.g. considering the PM nodes $205_i$ as a whole, for example by averaging the nominal or theoretical or maximum processing loads that can be sustained by all the processing boards $B_{i,j}$ of all the PM nodes $205_i$).

According to the exemplary considered embodiment, ach i-th PM node $205_i$ is designed such that the processing load on the CPU of each respective j-th processing board $B_{i,j}$ is set at an allowable processing load L (hereinafter referred to as processing load usage level L); for the purposes of the present disclosure, the allowable processing load L is the processing load (typically lower than the nominal or theoretical or maximum processing load) at which each j-th processing board $B_{i,j}$ is actually set (or limited), and advantageously acts as a safeguard processing load for allowing a safe operation of the processing boards $B_{i,j}$ (and hence of the PM nodes $205_i$); as better discussed in the following, values of the processing load usage level L will be taken into account for dimensioning the PCRF module 150 (and, particularly, for determining the number I(t+1) of PM nodes $205_i$ and the number J(t+1) of processing boards $B_{i,j}$ for each i-th PM node $205_i$). Without losing generality, the $CPU_{Load,Bi,j}(t)$ parameter and/or the $CPU_{Load}(t)$ parameter may be expressed as a percentage of the processing load usage level L (additionally or alternatively to the percentage of the nominal or theoretical or maximum processing load that can be sustained by the j-th processing board $B_{i,j}$ of the i-th PM node $205_i$.

The dimensioning method 300 preferably comprises (at action node 315) determining a number of transactions per second for each active connection managed by the PM nodes $205_i$ at the time instant t (hereinafter referred to as signalling consumption or SC(t) parameter): in fact, as mentioned above, each connection, or active connection, may comprise (and typically comprises) one or more signalling events. Preferably, the SC(t) parameter is determined based on the TPS(t) parameter and on the Context(t) parameter, more preferably the SC(t) parameter is determined as:

$$SC(t) = \frac{TPS(t)}{Context(t)} \qquad (i)$$

The SC(t) parameter is therefore indicative of the signalling traffic required on average by each active connection at the time instant t.

The SC(t) parameter is advantageously stored in a proper memory location (not shown), such as a memory location of the control unit 215, preferably together with historical signalling consumption parameters (i.e., the signalling consumption parameters determined at a number or predetermined number of previous time instants before the current time instant t).

The signalling consumption is a parameter that is often relatively stable over time but it may change as service characteristics or network parameters change. In order to take into account these changes (potentially occurring from the current time instant t onwards, and before a following considered time instant (t+1) following the current time instant t), an estimated number of transactions per second for each connection managed by the PM nodes $205_i$ at the time instant t (hereinafter referred to as estimated signalling consumption or ESC(t) parameter) is determined (action node 320). The ESC(t) parameter is preferably based on the SC(t) parameter and on the historical signalling consumption parameters. More preferably, the ESC(t) parameter is an average signalling consumption parameter determined according to (e.g., by averaging) the SC(t) parameter and the historical signalling consumption parameters: thus, the ESC(t) parameter so determined estimates future changes in service characteristics and/or in network parameters based on the past changes in service characteristics and/or in network parameters as inherently indicated by the historical signalling consumption parameters (thus, the ESC(t) parameter is indicative of the number of transactions per second that are expected to be exchanged for each active connection at the time instant t, as opposed to the SC(t) parameter which instead provides an indication of an instant signalling consumption referred to the specific time instant t). The ESC(t) parameter may be optional in a basic implementation of the dimensioning method 300; however, in the preferred embodiment herein considered, the ESC(t) parameter is advantageously determined and preferably exploited at a following forecast step (see action node 335 in the figure).

The dimensioning method 300 preferably comprises determining a number of transactions per second at processing load usage level L at time instant t (hereinafter also referred to as $TPS_L(t)$ parameter)—action node 325 (the processing load usage level L being for example input to the action node 325, and being for example determined or retrieved at action node 305, e.g. contextually to the determination of configuration of the PCRF module 150). In other words, the $TPS_L(t)$ parameter is indicative of the number of transactions per second (or instant number of transactions per second, as discussed here below) that may be exchanged by the PCRF module 150 at the time instant t taking into account the limitation on the number of transactions per second due to the safeguard processing load (i.e., the processing load usage level L) at which each j-th processing board $B_{i,j}$ of each i-th PM node $205_i$ is set. The determination of the $TPS_L(t)$ parameter is preferably based on the ascertaining by the Applicant of a strong correlation existing between the TPS(t) parameter and the $CPU_{Load}(t)$ parameter. In this respect, FIG. 4 shows, on the top chart, an example of a daily profile of signalling traffic exchanged between the PCRF module 150 and the GGSN 125 and P-GW 140 modules (i.e., the number of transactions per second exchanged over a sample day between the PCRF module 150 and the GGSN 125 and P-GW 140 modules, or otherwise stated the trend of the TPS(t) parameter over the sample day) and of a corresponding average processing load on the CPUs of the processing boards $B_{i,j}$ of the PM nodes $205_i$ of the PCRF module 150 that are processing the signalling at the time instant t (or otherwise stated the trend of the $CPU_{Load}(t)$ parameter over the sample day), and, on the bottom chart, a correlation between the TPS(t) parameter and the $CPU_{Load}(t)$ parameter (e.g., between the trend or profile of the TPS(t) parameter and the trend or profile of the $CPU_{Load}(t)$ parameter). The top chart of FIG. 4 explicitly shows that the TPS(t) parameter and the $CPU_{Load}(t)$ parameter have a similar trend over the sample day. The bottom chart of FIG. 4 explicitly shows that the TPS(t) parameter and the $CPU_{Load}(t)$ parameter are in a linear relationship to each other. Based on this linear relationship, the $CPU_{Load}(t)$ parameter may be expressed as:

$$CPU_{Load}(t) = \frac{TPS(t) * L}{TPS_L(t) * l} \qquad (ii)$$

where I is the number of PM nodes $205_i$ and L is the processing load usage level. The $TPS_L(t)$ parameter may therefore be expressed as:

$$TPS_L(t) = \frac{TPS(t)*L}{CPU_{Load}(t)*I} \quad \text{(iii)}$$

The dimensioning method 300 preferably comprises, still at action node 325, determining a number of transactions per second at processing load usage level L of each allocated processing board $B_{i,j}$ (i.e., of each processing board $B_{i,j}$ that is actually involved in signalling traffic exchange) among the J*I processing boards $B_{i,j}$ at time instant t (hereinafter also referred to as $TPS_{L,Bi,j}(t)$ parameter). Similarly to the $TPS_L(t)$ parameter, the $TPS_{L,Bi,j}(t)$ parameter may be expressed as follows:

$$TPS_{L,Bi,j}(t) = \frac{TPS(t)*L}{CPU_{Load,Bi,j}(t)*\frac{I}{n}} \quad \text{(iv)}$$

where n is the number of allocated processing boards $B_{i,j}$ over the I PM nodes $205_i$.

The $TPS_L(t)$ and $TPS_{L,Bi,j}(t)$ parameters are advantageously stored in proper memory locations (not shown), such as memory locations of the control unit 215, preferably together with, respectively, historical numbers of (overall or total) transactions per second at processing load usage level L (i.e., (the overall or total) transactions per second at processing load usage level L parameters determined at a number or predetermined number of previous time instants before the current time instant t), hereinafter referred to as historical $TPS_L$ parameters, and historical numbers of transactions per second at processing load usage level L of each allocated processing board (i.e., the transactions per second at processing load usage level L of each allocated processing board parameters determined at a number or predetermined number of previous time instants before the current time instant t), hereinafter referred to as historical $TPS_{L,Bi,j}$ parameters.

Preferably, the dimensioning method 300 also comprises, at action node 330, determining estimated (overall or total) transactions per second at processing load usage level L at time instant t (hereinafter, $ETPS_L(t)$ parameter). More preferably, as herein exemplary considered, the dimensioning method 300 also comprises, at action node 330, determining also estimated transactions per second at processing load usage level L of each allocated processing board $B_{i,j}$ at time instant t (hereinafter, $ETPS_{L,Bi,j}(t)$ parameter). Preferably, the $ETPS_L(t)$ parameter and the $ETPS_{L,Bi,j}(t)$ parameter are based, respectively, on the $TPS_L(t)$ and historical $TPS_L$ parameters, and on the $TPS_{L,Bi,j}(t)$ and on the historical $TPS_{L,Bi,j}$ parameters. More preferably, the $ETPS_L(t)$ parameter is an average parameter determined according to (e.g., by averaging) the $TPS_L(t)$ and the historical $TPS_L$ parameters, and the $ETPS_{L,Bi,j}(t)$ parameter is an average parameter determined according to (e.g., by averaging) the $TPS_{L,Bi,j}(t)$ and the historical $TPS_{L,Bi,j}$ parameters. Thus the $ETPS_L(t)$ and $ETPS_{L,Bi,j}(t)$ parameters are indicative of the number of transactions per second that are expected to be exchanged for each active connection at the time instant t (by the processing nodes $205_i$ and by each processing board respectively) set at the processing load usage level L (in that, thanks to the historical $TPS_L$ and $TPS_{L,Bi,j}$ parameters, future changes in service characteristics and/or in network parameters based on the past changes in service characteristics and/or in network parameters are taken into account), as opposed to the $TPS_L(t)$ and $TPS_{L,Bi,j}(t)$ parameters which instead provide indications of corresponding instant transactions per second referred to the specific time instant t. The $TPS_L(t)$ and/or $TPS_{L,Bi,j}(t)$ parameters may be optional in a basic implementation of the dimensioning method 300. It is remarked that the $ETPS_L(t)$ and/or $ETPS_{L,Bi,j}(t)$ parameters may also be determined according to other measurements and/or relationships.

Then, the dimensioning method 300 preferably comprises, at action node 340, determining the number I(t+1) of PM nodes $205_i$ required at the following time instant (t+1) following the current time instant t, and deploying them in the PCRF module 150. Preferably, the number I(t+1) of PM nodes $205_i$ is determined according to a forecasted number of transactions per second that are forecasted to be sent/received by the PCRF module 150 at the following time instant (t+1) (hereinafter referred to as TPS(t+1) parameter), and according to forecasted estimated transactions per second at processing load usage level L at the following time instant (t+1) (hereinafter, $ETPS_L(t+1)$ parameter). More preferably, the number I(t+1) of PM nodes $205_i$ is determined according to a ratio between the TPS(t+1) parameter and the $ETPS_L(t+1)$ parameter:

$$I(t+1) = \frac{TPS(t+1)}{ETPS_L(t+1)}$$

where the number I(t+1) is preferably rounded up to the next integer value.

The TPS(t+1) parameter is preferably determined according to at least one among a forecasted number of connections that are forecasted to be managed by the PCRF module 150 at the time instant (t+1) (hereinafter, Context(t+1) parameter), according to a forecasted estimated signalling consumption for the time instant (t+1) following the current time instant t (hereinafter, ESC(t+1) parameter), and according to the $ETPS_L(t+1)$ parameter, and particularly according to change (i.e., increase or decrease), e.g. by a predefined amount, of at least one among the Context(t+1), ESC(t+1) and $ETPS_L(t+1)$ parameters with respect to, respectively, the Context(t), ESC(t) and $ETPS_L(t)$ parameters. The Context(t+1), ESC(t+1) and $ETPS_L(t+1)$ parameters, and hence the TPS(t+1) parameter, are determined based on a proper forecast step (see action node 335 in the figure). According to an embodiment of the present invention, the following four forecasted scenarios (a)-(d) are considered at action node 335:

(a): Context (t+1) parameter change (i.e., increase or decrease) with respect to the Context(t) parameter.

$$TPS(t+1) = ESC(t)*\text{Context}(t+1)$$

$$CPU_{Load}(t+1) = \frac{TPS(t+1)*L}{ETPS_L(t)*I(t)} \Rightarrow ETPS_L(t) = \frac{TPS(t+1)*L}{CPU_{Load}(t+1)*I(t)}$$

$$ETPS_L(t+1) = ETPS_L(t)$$

The Context (t+1) parameter preferably depends on marketing information available at (and preferably provided by) a network operator of the communication system 100.

According to an advantageous embodiment of the present invention, the Context (t+1) parameter is determined based on analysis of at least one among data traffic for "Access Point Name" (APN) and "Radio Access Technology" (RAT) type.

(b) ESC(t+1) parameter change (i.e., increase or decrease) with respect to the ESC(t) parameter. The ESC(t+1) parameter is preferably based on historical estimated signalling consumption parameters (preferably including the ESC(t) parameter), and on changes of service characteristics and/or network parameter(s) in the communication system 100 (for example, when a service requires new policy rules that inspect the type of customer data traffic, the estimated signalling consumption parameter may increase significantly due to additional signalling for data traffic inspection):

$$TPS(t+1) = ESC(t+1)*$$

$$CPU_{Load}(t+1) = \frac{TPS(t+1)*L}{ETPS_L(t)*I(t)} \Rightarrow ETPS_L(t) = \frac{TPS(t+1)*L}{CPU_{Load}(t+1)*I(t)}$$

$$ETPS_L(t+1) = ETPS_L(t)$$

(c) $ETPS_L(t+1)$ parameter change (i.e., increase or decrease) with respect to the $ETPS_L(t)$ parameter. The $ETPS_L(t+1)$ parameter is preferably based on historical estimated transactions per second at processing load usage level L (including, for example, the $ETPS_L(t)$ parameter), and on changes of policy rules and/or connection types in the communication system 100:

$$TPS(t+1) = ESC(t)*Context(t)$$

$$CPU_{Load}(t+1) = \frac{TPS(t)*L}{ETPS_L(t+1)*I(t)} \Rightarrow ETPS_L(t+1) = \frac{TPS(t)*L}{CPU_{Load}(t+1)*I(t)}$$

(d) Context (t+1) parameter change (i.e., increase or decrease) with respect to the Context (t) parameter, or ESC(t+1) parameter change (i.e., increase or decrease) with respect to the ESC(t) parameter, or $ETPS_L(t+1)$ parameter change (i.e., increase or decrease) with respect to the $ETPS_L(t)$ parameter:

$$TPS(t+1) = ESC(t+1)*Context(t+1)$$

$$CPU_{Load}(t+1) = \frac{TPS(t+1)*L}{ETPS_L(t+1)*I(t)} \Rightarrow ETPS_L(t+1) = \frac{TPS(t+1)*L}{CPU_{Load}(t+1)*I(t)}$$

Back to the activity diagram, the number I(t+1) of PM nodes 205$_i$ required at time instant (t+1) determined at action node 340 may advantageously take into account also a maximum number MB of processing boards that is allowed for each PM node 205$_i$ (the maximum number MB being for example input to the action node 340, and being for example determined or retrieved at action node 305, e.g. contextually to the determination of the configuration of the PCRF module 150). In this case, the number I(t+1) of PM nodes 205$_i$ required at time instant (t+1) may be determined as follows:

$$I(t+1) = \frac{\frac{TPS(t+1)}{ETPS_{L,Bi,j}(t+1)}}{\min\left(MB, \frac{ETPS_L(t+1)}{ETPS_{L,Bi,j}(t+1)}\right)}$$

where the $ETPS_{L,Bi,j}(t+1)$ parameter is advantageously determined similarly to the $ETPS_L(t+1)$ parameter as discussed in the above considered forecasted scenarios (a)-(d) (but considering the $ETPS_{L,Bi}(t)$ parameter instead of the $ETPS_L(t)$ parameter).

The dimensioning method 300 preferably comprises, still at action node 335, determining the number J(t+1) of processing boards $B_{i,j}$ required at time instant (t+1) (J(t+1) parameter):

$$J(t+1) = \frac{TPS(t+1)}{ETPS_{L,Bi}(t+1)}$$

where the J(t+1) parameter is preferably rounded up to the next integer value.

Preferably, the TPS(t+1) parameter is determined as above according to the above considered forecasted scenarios (a)-(d), and the $ETPS_{L,Bi}(t+1)$ parameter is preferably determined similarly to the $ETPS_L(t+1)$ (but considering the $ETPS_{L,Bi}(t)$ parameter instead of the $ETPS_L(t)$ parameter).

The dimensioning method 300 preferably comprises, still at action node 335, determining the time (or planning time) required to apply the increase of number of PM nodes 205$_i$. Particularly, the planning time is the generic following time instant (t+1), following with respect to a generic current time instant t, for which the following inequality is satisfied:

$$TPS(t+1) > ETPS_L(t)*I(t)$$

which means that the following time instant (t+1) requires additional PM nodes 205$_i$ if the transactions per second forecasted for that time instant (t+1) is higher than the estimated transactions per second at processing load usage level L at the current time instant t over the whole current number I(t) of PM nodes 205$_i$.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the communication system has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

For example, although in the above discussion explicit reference has been made to 2G/3G and LTE radio access networks, this should not be construed as limiting. In fact, the principles of the present invention equivalently apply to communication systems wherein the 2G/3G and/or LTE radio access networks coexist together with other access networks. Considering, just as an example, a communication system in which the 5G radio access network is implemented in addition to the 2G/3G and/or LTE radio access networks, a similar architecture to that of the communication system of FIG. 1 would be obtained. Particularly, the resulting communication system would comprise a 5G transceiver station for connection to the 5G radio access network (similarly to the 2G/3G transceiver station 105 for connection to the 2G/3G radio access network and to the LTE transceiver station 110 for connection to the LTE radio access network), a "User Plane Function" (UPF) module (having similar functionalities to the SGSN module 115), a "Session Management Function" (SMF) module (having similar functionalities to the GGSN module 125), and a "Policy Control Function" (PCF) module (having similar functionalities to the PCRF module 150)—for architectural details of the 5G technology and for a thorough discussion of the functionalities of the UPF, SMF and PCF modules see for example 3GPP TS 23.501 V1.0.0 (2017-06), which is herein incorporated by reference.

Moreover, although reference has been made in the above description mainly to mobile communication networks and systems, the present invention applies also, in general, to communication networks and systems, even if including a fixed access network or a mixed type access network.

The invention claimed is:

1. A method for dimensioning a policy and charging rules function (PCRF) module of a communication system, the method comprising:
   determining a number of processing nodes of the PCRF module at a time instant;
   determining a first transaction parameter indicative of a number of transactions per second
exchanged by the processing nodes at the time instant;
   determining a load parameter indicative of a processing load of the processing nodes at the time instant;
   based on the first transaction parameter, the load parameter, the number of processing nodes, and an allowable processing load at which the processing nodes are set for allowing a safe operation thereof, determining a second transaction parameter indicative of a number of transactions per second that are expected to be exchanged at the time instant by the processing nodes set at the allowable processing load;
   forecasting the first transaction parameter for a following time instant following the time instant to obtain a forecasted first transaction parameter;
   forecasting the second transaction parameter for the following time instant to obtain a forecasted second transaction parameter; and
   determining a number of processing nodes required at the following time instant according to the forecasted first transaction parameter and the forecasted second transaction parameter,
   wherein the determining a number of processing nodes at the following time instant is based on a ratio between the forecasted first transaction parameter and the forecasted second transaction parameter.

2. The method according to claim 1, further comprising:
   determining a context parameter indicative of a number of active connections that are managed by the processing nodes at the time instant, each active connection comprising one or more exchanged transactions that are exchanged by the processing nodes at the time instant;
   based on the first transaction parameter and the context parameter, determining a signalling consumption parameter indicative of a number of transactions per second that are expected to be exchanged for each active connection at the time instant; and
   forecasting the context parameter and the signalling consumption parameter for the following time instant to obtain a forecasted context parameter and a forecasted signalling consumption parameter,
   wherein the forecasting the first transaction parameter is based on at least one among the forecasted context parameter, the forecasted signalling consumption parameter, and the forecasted second transaction parameter.

3. The method according to claim 2, wherein the forecasting the first transaction parameter is based on a change of at least one among the forecasted context parameter, the forecasted signalling consumption parameter and the forecasted second transaction parameter with respect to the context parameter, the signalling consumption parameter and the second transaction parameter, respectively.

4. The method according to claim 2, wherein the forecasted context parameter depends on marketing information provided by a network operator of the communication system.

5. The method according to claim 2, wherein the forecasted context parameter is based on analysis of at least one among data traffic for access point name and type of radio access technology.

6. The method according to claim 3, wherein the forecasted signalling consumption parameter depends on service and/or parameter changes in the communication system.

7. The method according to claim 1, wherein the forecasted second transaction parameter depends on policy rule and/or connection type changes in the communication system.

8. The method according to claim 2, wherein the determining a signalling consumption parameter comprises:
   determining an instant signalling consumption parameter based on a ratio between the first transaction parameter and the context parameter, and
   determining the signalling consumption parameter based on historical instant signalling consumption parameters determined before the time instant, by averaging the instant signalling consumption parameter and the historical instant signalling consumption parameters.

9. The method according to claim 1, wherein the determining a second transaction parameter comprises:
   determining an instant second transaction parameter based on a ratio between the first transaction parameter and the load parameter, and on a ratio between the number of processing nodes and the allowable processing load, and determining the second transaction parameter based on historical instant second transaction parameters determined before the time instant, by averaging the instant second transaction parameter and the historical instant second transaction parameters.

10. The method according to claim 1, wherein each processing node comprises one or more processing units, the determining a load parameter indicative of a processing load of the processing nodes at the time instant comprising:

determining, for each processing node, at least one further load parameter each one indicative of a processing load of a respective processing unit of that processing node at the time instant, and determining the load parameter based on the at least one further load parameter and on a number of the one or more processing units.

11. The method according to claim 10, further comprising:

based on the at least one further load parameter, determining a further second transaction parameter indicative of a number of transactions per second that are expected to be exchanged at the time instant by each processing unit set at the allowable processing load, and forecasting the further second transaction parameter for the following time instant to obtain a forecasted further second transaction parameter, wherein the determining a number of processing nodes required at the following time instant is also based on the forecasted further second transaction parameter and a maximum number of processing units that is allowed for each processing node.

12. The method according to claim 11, further comprising:

determining a number of processing units required at the following time instant according to a ratio between the forecasted first transaction parameter and the forecasted further second transaction parameter.

13. The method according to claim 1, further comprising determining that the following time instant requires additional processing nodes if the forecasted first transaction parameter is higher than the second transaction parameter evaluated over the number of processing nodes.

* * * * *